March 5, 1940.     O. J. OSTLIND     2,192,452
VALVE
Filed Feb. 20, 1939
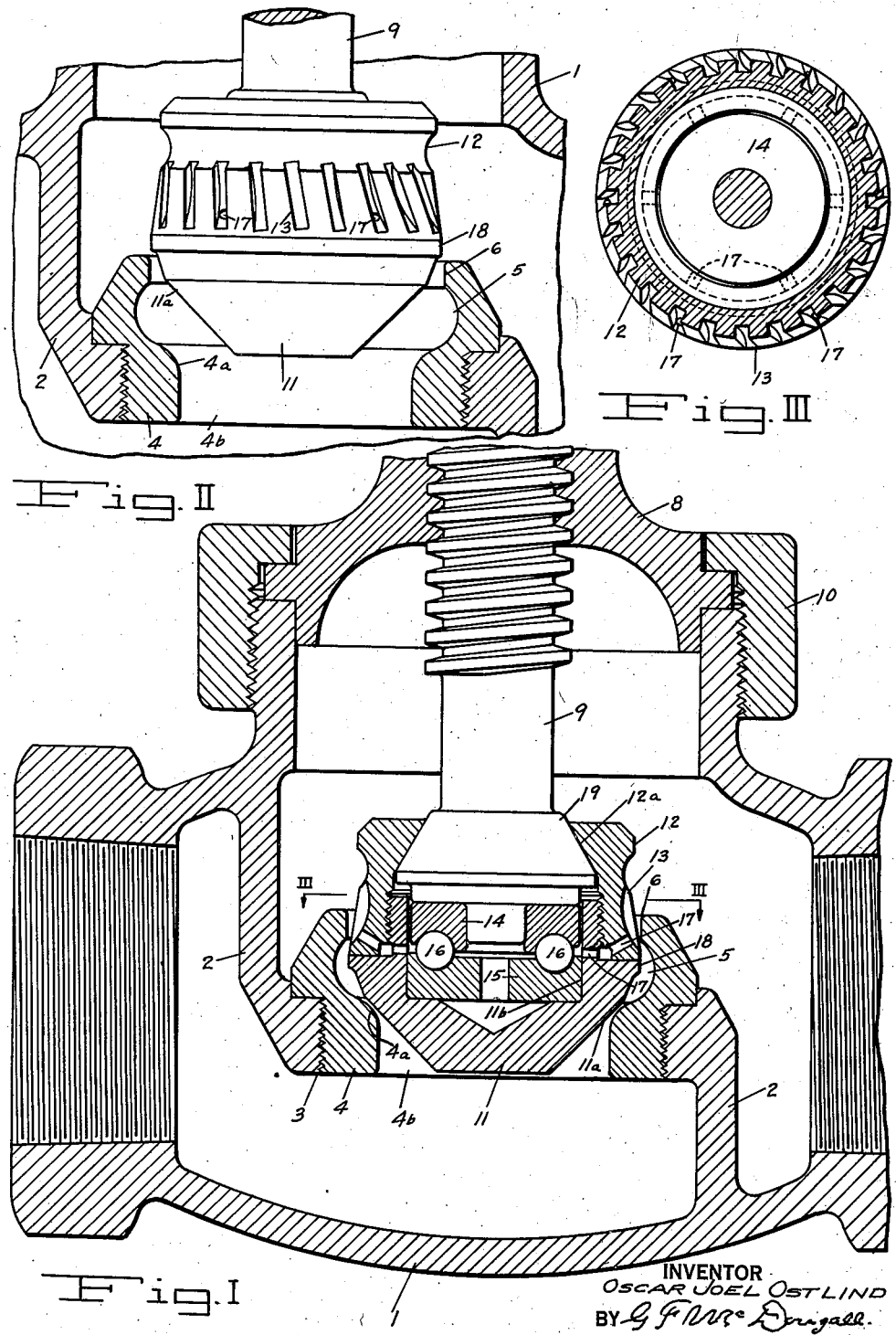
INVENTOR
OSCAR JOEL OSTLIND
BY G. F. McDougall.
ATTORNEY Patented Mar. 5, 1940

2,192,452

UNITED STATES PATENT OFFICE 2,192,452

VALVE

Oscar Joel Ostlind, Portland, Oreg.

Application February 20, 1939, Serial No. 257,373

4 Claims. (Cl. 251—29)

This invention relates to a self-grinding throttling valve, preferably employing the basic principle of the valve patented to me by my Patent No. 1,977,892, and containing novel structure that greatly prolongs its life in situations where conditions are severe.

The new structure is peculiarly adapted to combination with a self-grinding valve containing a reversing chamber superposed on the valve seat and consists in substantial part of a throttling valve, spaced from the point where closure is effective between valve and valve seat and so proportioned that when throttling steam flow for example, the steam velocity past the closure seat and valve will be very much less than at the point where throttling actually takes place.

The principal object of the invention is a combination throttling and stop valve, for insertion in a steam line subject to severe service, that can be expected to remain undamaged for long periods where the valve and seat throttling valve will be short lived.

Other objects additional to the main object as above stated will be ascertained from the following description and the novel structures by which they are achieved are definitely pointed out in the claims.

A drawing showing a preferred form of the invention accompanies and forms a part of this specification and is copied from the working drawings of a highly successful embodiment of the invention that has successfully "stood up" under severe conditions. The relative proportions shown in the drawing are correct for this type of valve, though other proportions are not excluded save as hereinafter pointed out.

The drawing consists of three figures.

Fig. I is a longitudinal section of a globe valve with parts broken away that will be understood even if omitted;

Fig. II is part of the same structure shown in Fig. I but with the parts in a different position, for purposes of explanation of the principle of operation; and Fig. III is a section on the line III—III, Fig. I.

In the drawing, a globe valve has a body 1 with the usual integral diaphragm 2 which is provided with a threaded seat opening 3 within which is screwed a hard metal valve seat member 4, provided with the usual axial opening 4b and an axial seating surface for the valve at 4a.

A curved wall reversing chamber 5 is formed in the material of the valve seat 4, above the seating surface 4a, having substantially greater diameter than the seating surface. The upper portion of the reversing chamber joins with a cylindrical bore 6 likewise provided in the material of the valve seat member, to form what I have called a throttling seat, to cooperate with the throttling ring of the valve, hereinafter described, although there is actually no seating contact, the throttling ring being a trifle less in diameter.

The body 1 is provided with a bonnet 8, within which is threaded the valve stem 9 and the bonnet is held to the body by the nut 10. This being standard construction for many years, no more detailed description is deemed necessary.

The valve stem 9 is provided with a head 19, upon which is revolubly mounted the valve 11, this reference numeral being used to indicate the whole valve assembly, now to be described more in detail.

It has been found that success of a self-grinding throttling valve over long periods connoted a ball bearing. Since this bearing cannot be lubricated it must be kept clear of condensate and scale; hence I make the valve of a hard lower valve portion 11a and a cover 12, the latter being provided with turbine blades 13, cut angularly with respect to the vertical axis of the cover 12 as shown. If given much more proportionate angle the speed will be too high.

The cover 12 and the seat portion 11a are provided with cooperating chambered portions 12a and 11b adapted to contain a ball bearing, consisting of upper and lower races 14 and 15, provided with balls in thrust relationship such as 16, and very important to get rid of condensate and scale, the radial holes 17 are provided through which the objectionable substances are thrown by centrifugal force when the valve seat revolves.

Another important structural element is the cylindrical throttling ring 18 which is an easy fit in the bore of the valve seat element 4, defined by the numeral 6.

In Fig. I, the valve structure 11 is shown near the seat 4a, in which position steam passing between the valve and seat will impinge on the turbine blades 13, causing rapid revolution of the valve 11, the principle being explained in the patent referred to.

It will be noted that with the proportions as shown, the area of opening between valve and seat is almost immediately greater than the steam passageway between 6 and 18, hence "wire-drawing" and cutting action is prevented. Throttling position is shown in Fig. II where the space for steam flow between valve and seat is several times that between 6 and 18, the turbine is out of contact with flow and hence not running and a restricted flow can be maintained almost indefinitely without any cutting action whatever on the cooperating valve and seat surfaces.

If we consider Fig. I to represent the valve just as it is being closed, it is at once apparent that the valve will be spinning at high speed when it first contacts the seat, which keeps it polished and prevents any pinching of hard scale into the metal.

In dry kiln use and in very many other situations a valve that can be throttled down to the required steam supply is indispensable, while the ordinary valve, especially with modern high temperature steam conditions, is very short lived. This valve costs considerably more to make than an ordinary valve of the same size, materials being equal, but when it is considered that outage for replacement and time of the fitter to put in a new valve is usually several times the cost of even the valve according to my invention, its economic worth would seem to be established.

I consider the combination of the revolving valve member, the turbine and the reversing chamber to be the best and in any event an equivalent of the reversing chamber should be used, or a similar chambered out space provided to reduce velocity of steam approaching the throttling members. The ball bearings and the turbine blades may be omitted with some sacrifice.

Having disclosed my invention in what is believed to be its best form, I also claim other forms that may fall within the scope of the claims.

I claim:

1. In a valve of the character described, a valve seat, a reversing chamber superposed on said seat, a throttling seat superposed on the reversing chamber, a revoluble valve that is movable through the throttling seat to contact the valve seat, the said valve being provided with a tapered valve portion, a median throttling portion that is larger than the valve and vanes angularly placed above the median portion to receive flow directed thereagainst by the reversing chamber after the throttling portion has passed through the throttling seat.

2. In a valve comprising a body, a valve seat in said body that is provided with a reversing chamber, a superposed cylindrical throttling seat and a valve movable towards and from the seat to open and close the same, the said valve being characterized by being provided with a tapered valve-seat contacting portion, a median cylindrical throttling portion and vanes that are subject to fluid flow from the reversing chamber, the median throttling portion being so spaced with respect to the throttling seat of the body that said median portion passes completely therethrough before the valve completely closes.

3. In a valve of the character described comprising a valve seat, a reversing chamber superposed on the seat, a valve that is movable towards and from the seat to control the same, vanes on the valve that are effective to receive turning moment from fluid passing the reversing chamber and an anti-friction mounting for the valve, the said mounting being characterized by means dependent on centrifugal force when the valve revolves to throw foreign substances out of the bearing.

4. In a valve, a body, a tapered valve seat in said body, a valve that is movable towards and from said seat to open or close the valve, a reversing chamber above the tapered seat and a cylindrical throttling seat above the reversing chamber, the said valve being formed with a tapered valve portion, a median throttling portion and vanes above the throttling portion that are adapted to turning influence by fluid flow upwards through the seat and the reversing chamber after the throttling portion of the valve has passed through the throttling seat.

OSCAR JOEL OSTLIND.